(12) United States Patent
Chong et al.

(10) Patent No.: US 9,720,473 B2
(45) Date of Patent: Aug. 1, 2017

(54) METHODS AND SYSTEMS FOR SUPPLYING AND RECEIVING POWER OVER ETHERNET

(71) Applicant: Pismo Labs Technology Limited, Kowloon (HK)

(72) Inventors: Ming Pui Chong, Hong Kong (HK); Tik Yan Wong, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 14/127,977

(22) PCT Filed: Apr. 17, 2013

(86) PCT No.: PCT/IB2013/053029
§ 371 (c)(1),
(2) Date: Dec. 20, 2013

(87) PCT Pub. No.: WO2014/170717
PCT Pub. Date: Oct. 23, 2014

(65) Prior Publication Data
US 2015/0323968 A1     Nov. 12, 2015

(51) Int. Cl.
*G06F 1/00*     (2006.01)
*H02J 1/10*     (2006.01)
(Continued)

(52) U.S. Cl.
CPC .............. *G06F 1/263* (2013.01); *G06F 1/266* (2013.01); *H04L 12/10* (2013.01)

(58) Field of Classification Search
CPC .................................................... G06F 1/3203
(Continued)

(56) References Cited

U.S. PATENT DOCUMENTS 7,373,528 B2 * 5/2008 Schindler ...................... 713/300
7,471,014 B2 * 12/2008 Lum et al. ...................... 307/83
(Continued)

FOREIGN PATENT DOCUMENTS

| CN | 101369899 A | 2/2009 |
|---|---|---|
| CN | 291294536 Y | 8/2009 |
| WO | 2012028981 A1 | 3/2012 |

OTHER PUBLICATIONS

Cisco Inc. (US), White Paper: Cisco Universal Power Over Ethernet: Unleash the Power of your Network, (2011).
(Continued)

*Primary Examiner* — Suresh Suryawanshi

(57) ABSTRACT

Methods and systems for supplying more power than a power limit to a powered device (PD) if the PD is capable of receiving power more than the power limit, and receiving power more than the power limit from a power sourcing equipment (PSE) if the PSE is capable of supplying power more than the power limit. The PD and the PSE operates in a power over Ethernet (PoE) environment. The system comprises a power receiving section and a power supply section. The power receiving section comprises a first power-receiving circuit and a second power-receiving circuit, where the first power-receiving circuit is used when receiving power up to the power limit, and the second power-receiving circuit is used when receiving power more than the power limit. The power-supply section comprises a first power-supply circuit and a second power-supply circuit, where the first power-supply circuit is used when supplying power up to the power limit, and the second power-supply circuit is used when supplying power more than the power limit.

30 Claims, 9 Drawing Sheets

(51) Int. Cl.
*G06F 1/26* (2006.01)
*H04L 12/10* (2006.01)

(58) Field of Classification Search
USPC .......................................................... 713/310
See application file for complete search history.

(56) References Cited

U.S. PATENT DOCUMENTS

| | | | |
|---|---|---|---|
| 7,504,748 B2* | 3/2009 | Chang et al. ................. | 307/126 |
| 8,026,635 B2 | 9/2011 | Diab et al. | |
| 8,122,266 B2* | 2/2012 | Karam ........................ | 713/300 |
| 8,581,438 B2* | 11/2013 | Heath et al. .................... | 307/43 |
| 9,069,539 B2* | 6/2015 | Schlichter | |
| 2005/0085212 A1 | 4/2005 | Peker et al. | |
| 2009/0070615 A1 | 3/2009 | Maggiolino et al. | |
| 2011/0283118 A1* | 11/2011 | Maniktala .................... | 713/300 |

OTHER PUBLICATIONS

International Search Report in International Application No. PCT/IB2013/053029, mailed on Jan. 23, 2014.

Written opinion of the International Searching Authority in International Application No. PCT/IB2013/0523029, mailed on Jan. 23, 2014.

* cited by examiner

[Fig. 1]
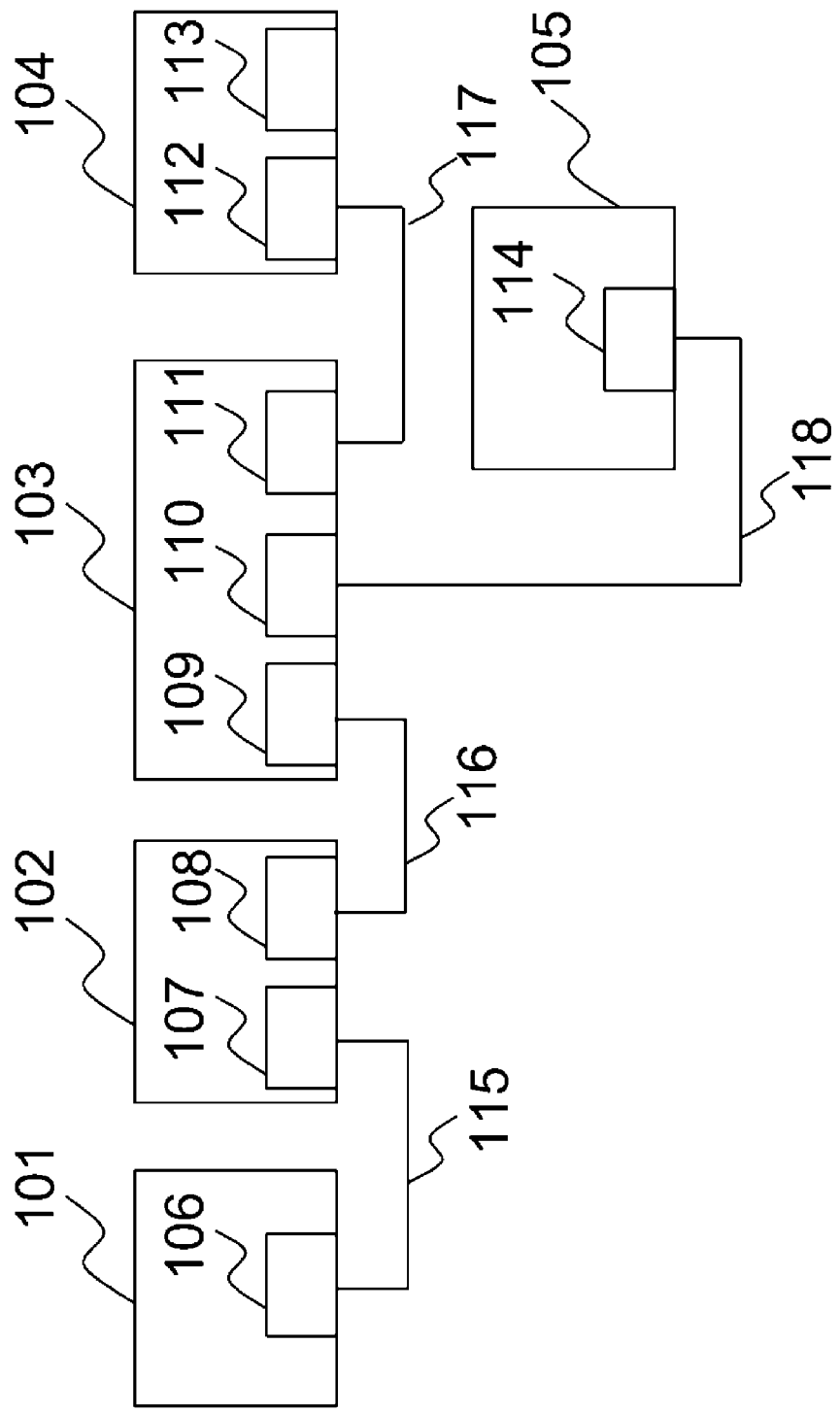

[Fig. 2]
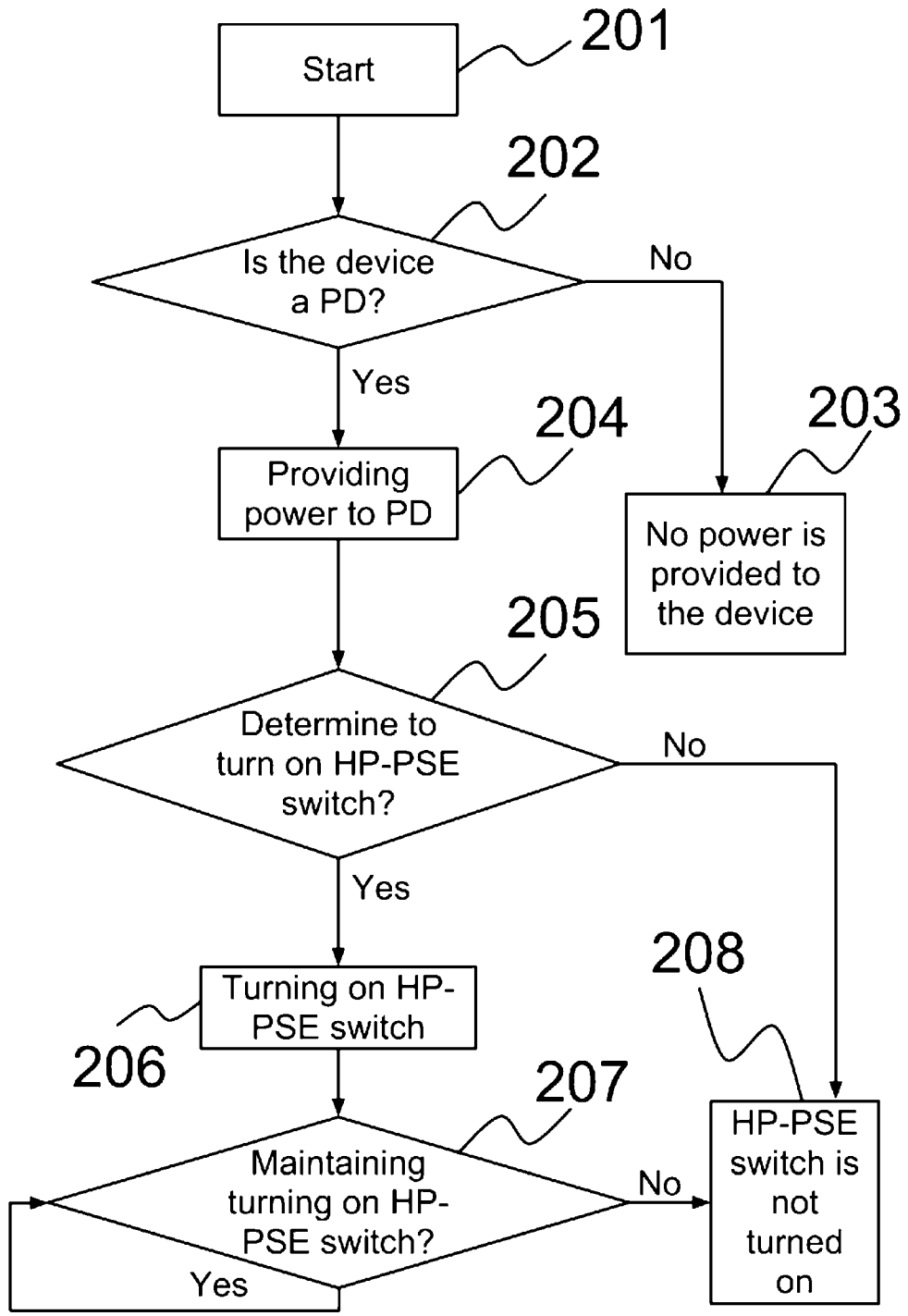

[Fig. 3A]
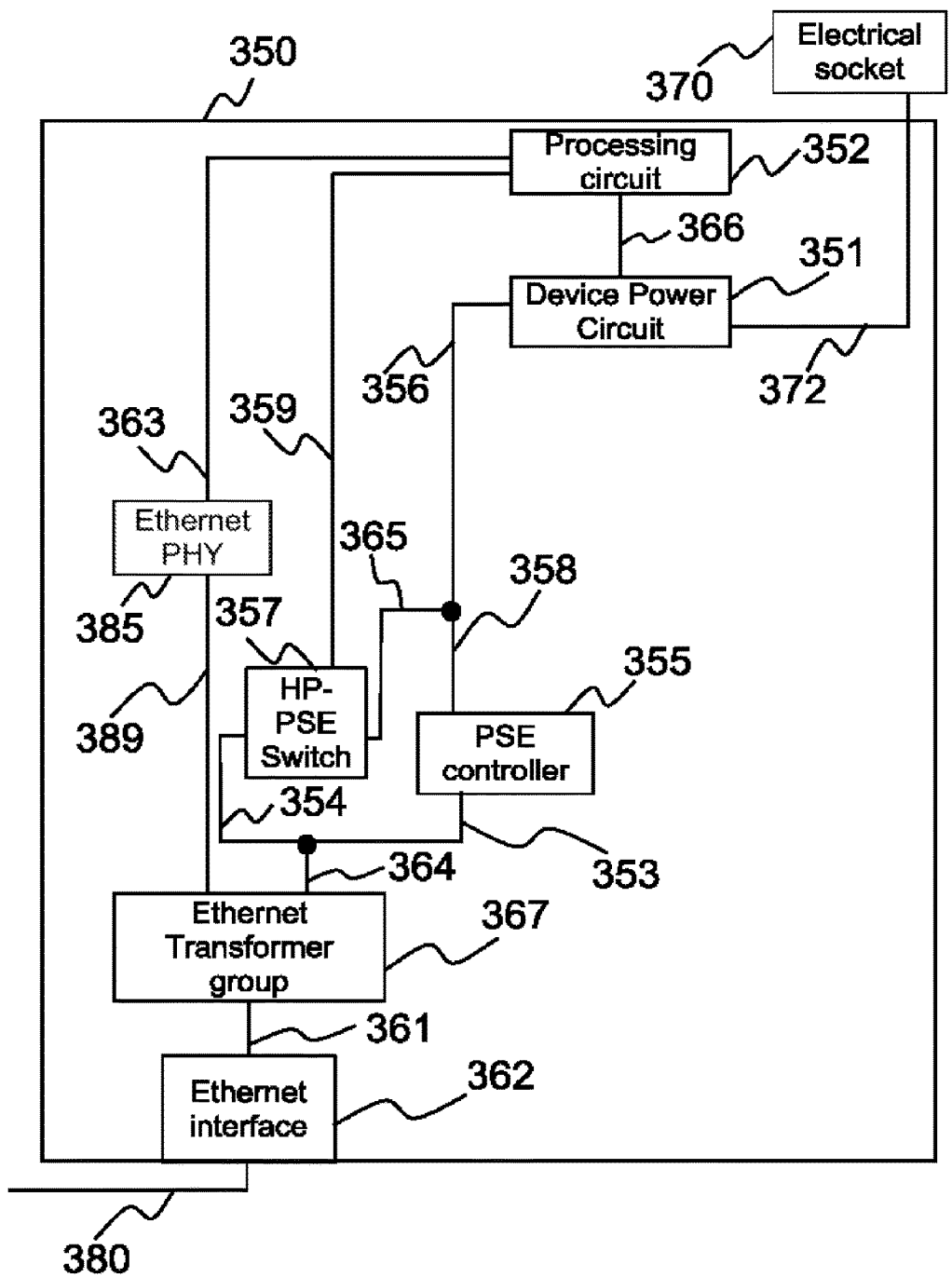

[Fig. 3B]
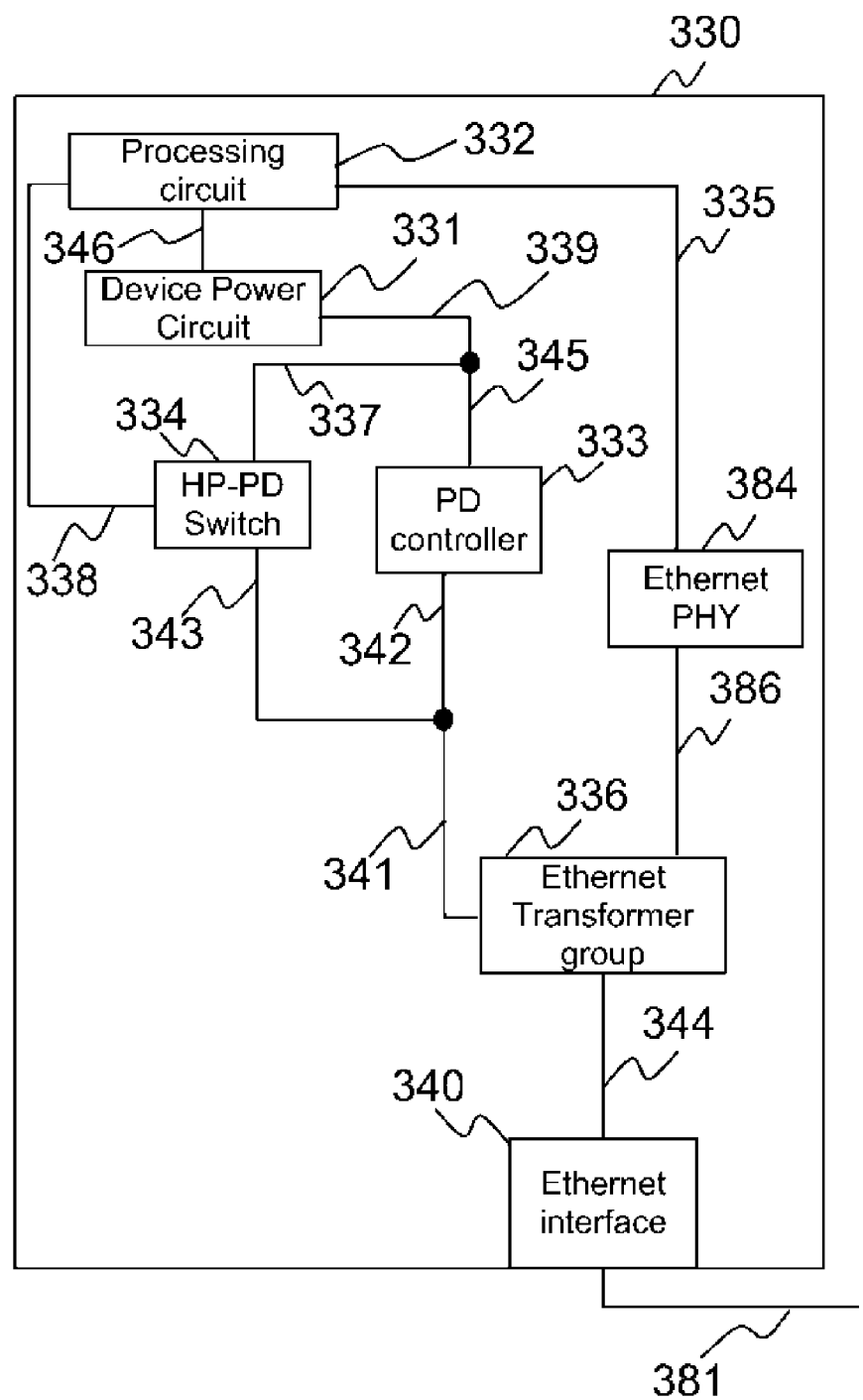

[Fig. 3C]
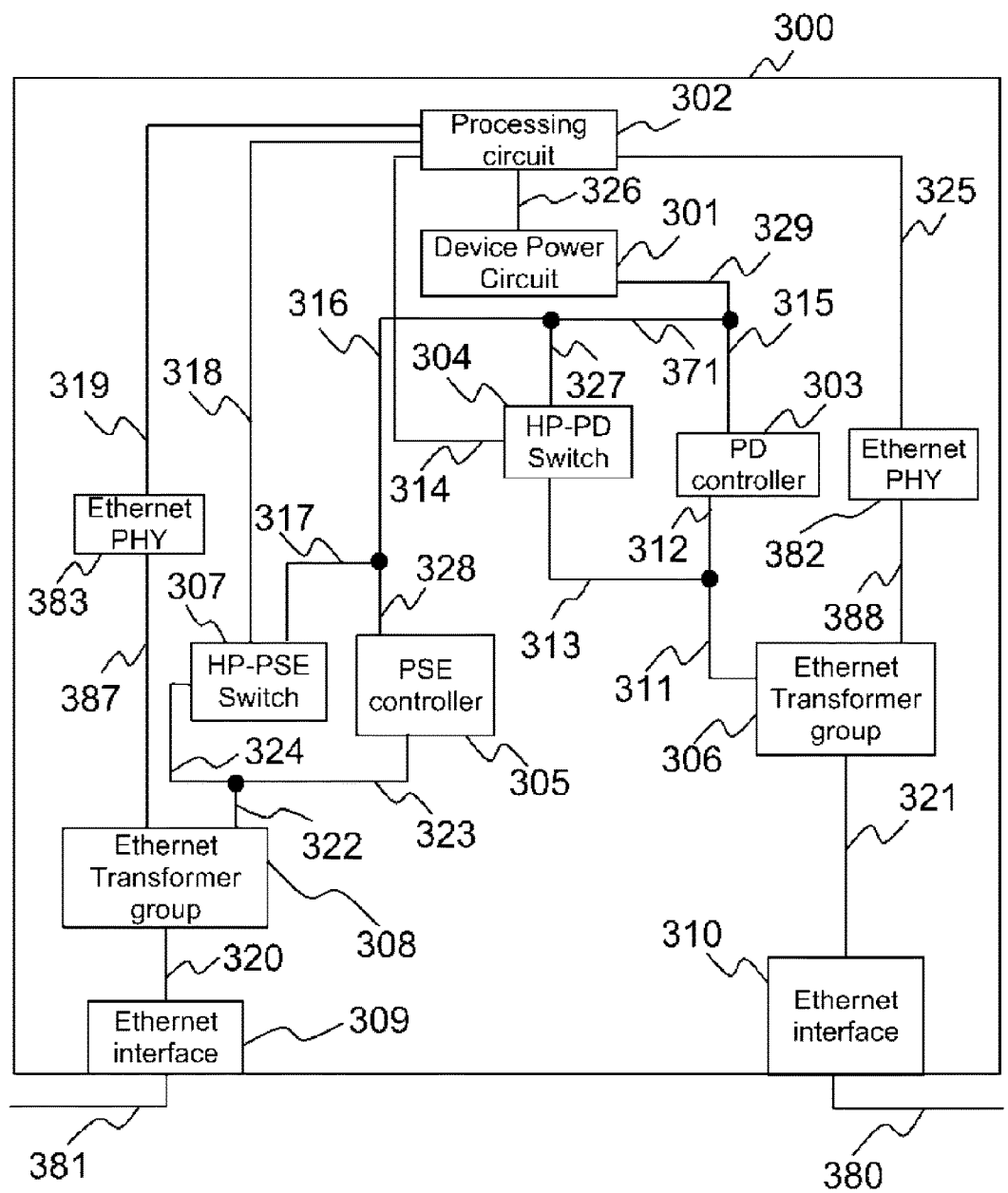

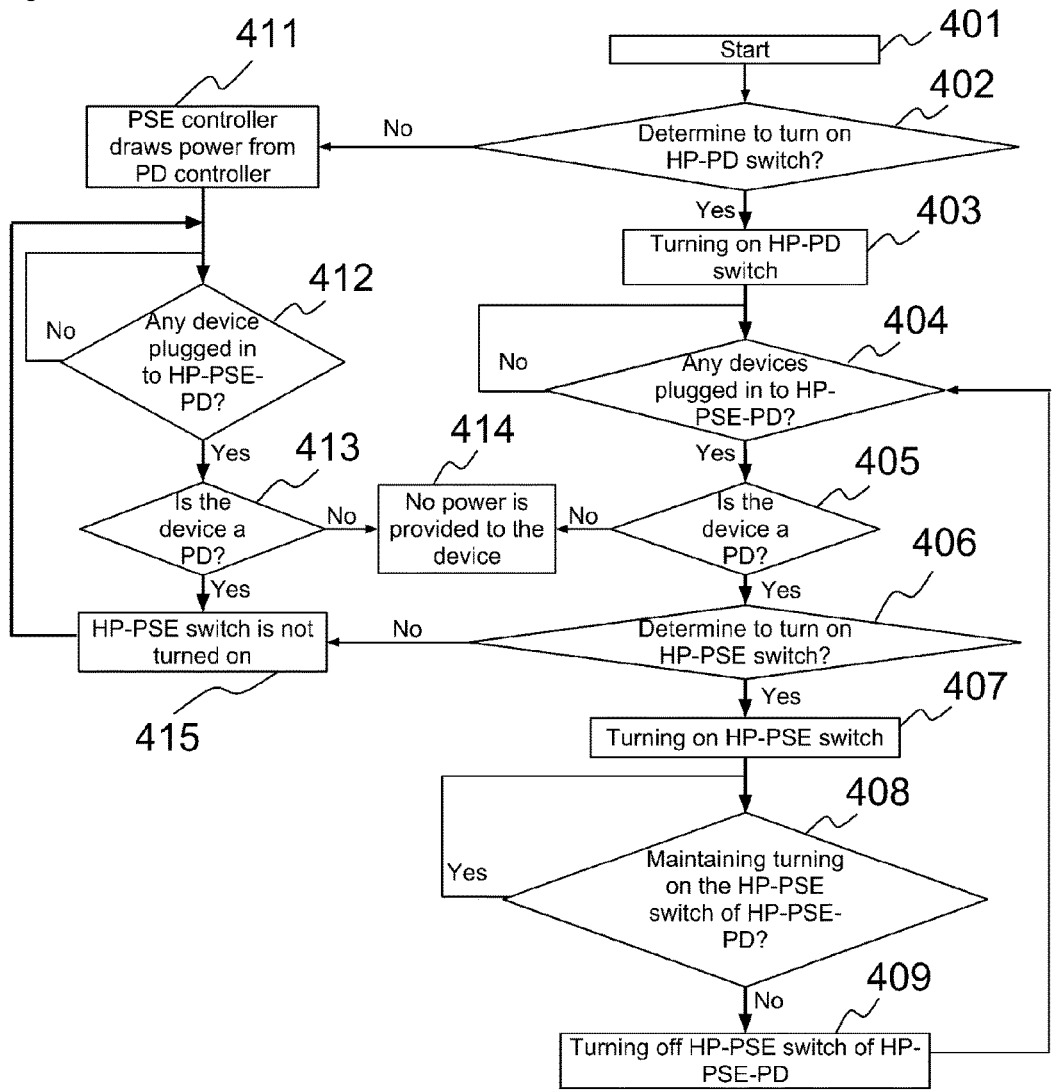
[Fig. 4]

[Fig. 5]
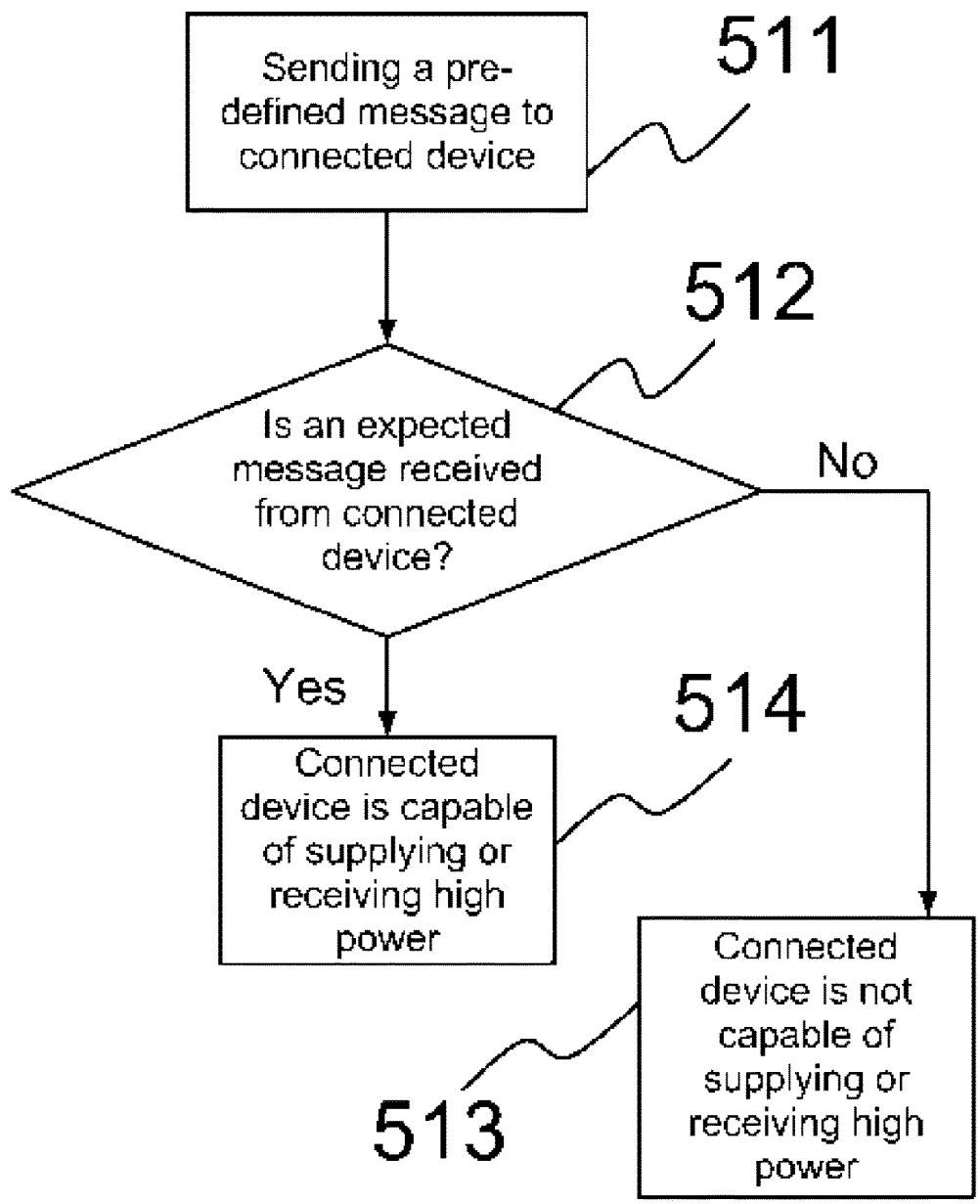

[Fig. 6]
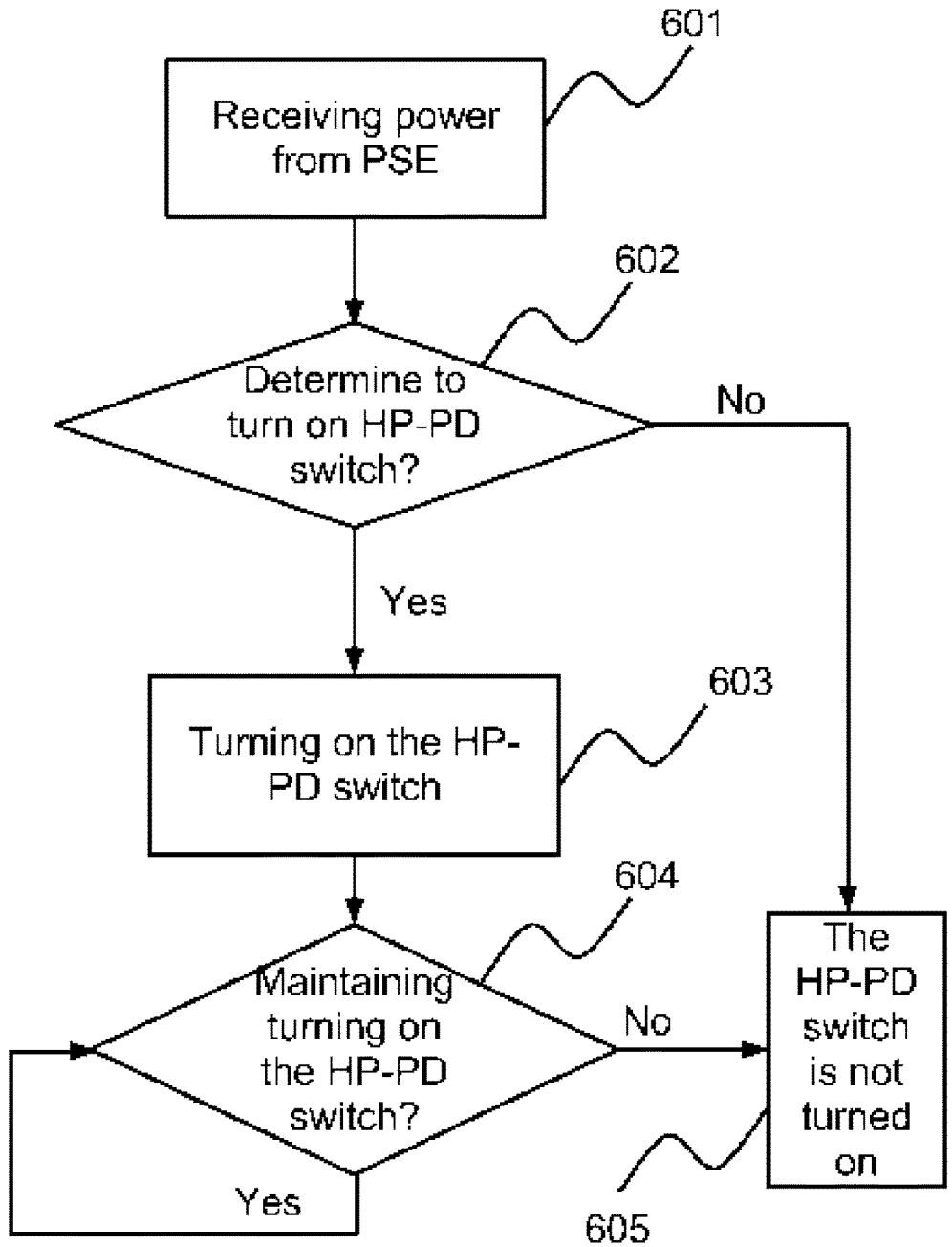

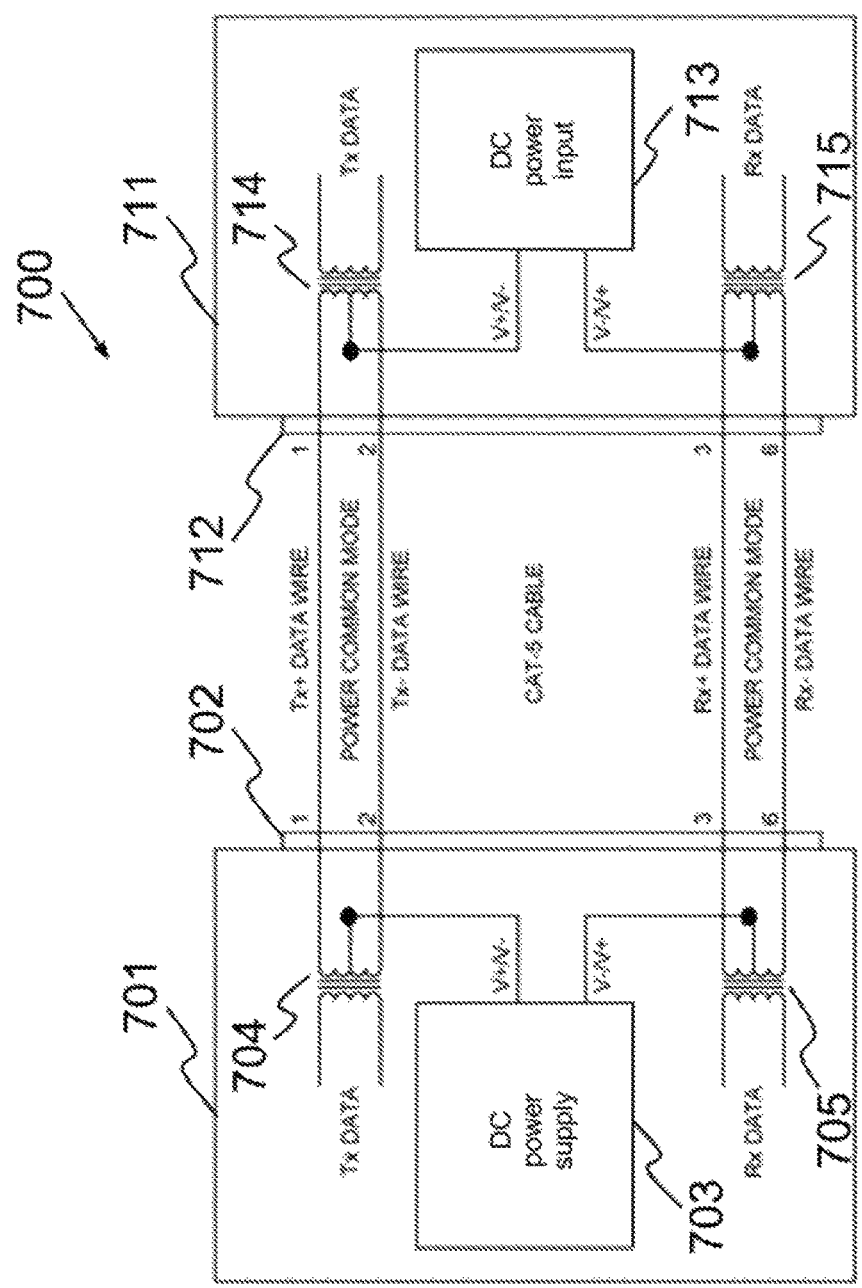
[Fig. 7 - PRIOR ART]

US 9,720,473 B2

METHODS AND SYSTEMS FOR SUPPLYING AND RECEIVING POWER OVER ETHERNET

CROSS-REFERENCE TO RELATED APPLICATIONS

This application is a national stage application of International Application No. PCT/IB2013/053029 filed on 17 Apr. 2013.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOIN INVENTOR

Not Applicable

BACKGROUND OF THE INVENTION (1) Technical Field

This disclosure relates in general to the field of computer networks, especially Power over Ethernet (PoE) devices. More particularly, the present invention relates to a PoE device, and to a method that allows PoE device to receive power more than a first power limit from a power sourcing equipment (PSE) and/or supply power more than the first power limit to a powered device (PD).

(2) Description of Related Art

U.S. Pat. No. 8,026,635 discloses a power sourcing equipment architecture (PSE) for variable maximum power delivery, excluding the architecture for a device comprising features of both a PSE and a powered device (PD). The power sourcing equipment architecture comprises an internal field-effect transistor (FET) and an external FET, which are controlled by a control switch, and allow variable amount of power delivery corresponding to a specific application. However, U.S. Pat. No. 8,026,635 does not disclose in detail the process to determine the amount of power required in the specific application.

FIG. 7 illustrates a detailed circuit schematic of Power over Ethernet (PoE) system 700 according to a prior art, where PSE 701 supplies power to PD 711 through Ethernet interfaces 702 and 712. DC power supply 703 generates output voltage that is applied across the respective center taps of Ethernet transformers 704 and 705. Ethernet transformers 704, 705, 714 and 715 include primary and secondary windings, where the center taps of the secondary windings of Ethernet transformers 704 and 705 are connected to voltage outputs of DC power supply 703, and the center taps of secondary windings of the Ethernet transformers 714 and 715 are connected to voltage inputs of DC power input 713. Ethernet transformers 705 and 704 pass data signals to and from Ethernet physical transceivers (Ethernet PHY) comprised in PSE 701 respectively. Lines 1, 2, 3, and 6 are used for supplying power to PD 711. Ethernet data, namely Rx Data and Tx data, are inputs and outputs to and from an Ethernet PHY respectively. The Ethernet data is transformer coupled and fully differential. The function of an Ethernet transformer, such as Ethernet transformers 704, 705, 714 or 715, is to isolate DC voltage from ports of Ethernet PHY(s).

The circuit of the PoE system described in the embodiments of the present invention, where power is supplied from a PSE to a PD, and Ethernet data is exchanged between the PSE and PD, is based on the ability of the Ethernet transformer to pass DC current through its center tap, and pass Ethernet data to Ethernet PHYs by isolating DC voltage from the ports of the Ethernet PHYs, as illustrated in FIG. 7.

BRIEF SUMMARY OF THE INVENTION

The present invention is directed to methods and systems which provide receiving and supplying power in a power over Ethernet (PoE) system. In one of the embodiments of the present invention, a PoE device determines whether or not a powered device is capable of receiving power over Ethernet, and then determines to use either a first power-supply circuit or a second power-supply circuit to supply power to the powered device. The first power-supply is capable of supplying power up to a power limit and the second power-supply is capable of supplying power more than the power limit. The PoE device operates at a power higher than a power range specified by IEEE 802.3af or IEEE802.3at standard. In one of the embodiments, determination to use the first power-supply circuit or second power-supply circuit is based on link status of an Ethernet link connecting the PoE device with the PD. In one of the embodiments, de-termination to use the first power-supply circuit or second power-supply circuit is based on a communication established by sending and receiving authentication messages through the Ethernet link connecting the PoE device with the PD.

In one of the embodiments, the PoE device further comprises determining whether to use either a first power-receiving circuit or a second power-receiving circuit to receive power from a power sourcing equipment (PSE). In one of the embodiments, determination to use the first power-receiving circuit or second power-receiving circuit is based on link status of an Ethernet link connecting the PoE device with the PSE. In one of the embodiments, determination to use the first power-receiving circuit or second power-receiving circuit is based on a communication established by sending and receiving authentication messages through the Ethernet link connecting the PoE device with the PD.

The PoE device is a high-power capable PoE device, i.e. it can operate at a power that is more than the power limit. The power limit may be the power range specified by IEEE802.3af standard or IEEE802.3at standard.

In one of the embodiments, the first power-supply circuit is a part of a PSE controller. The PSE controller also comprises a detection circuit to determine whether or not a device connected at an Ethernet interface of the PoE device is capable of receiving power over Ethernet. In one of the embodiments, the second power-supply circuit is a switch which can provide a current path through which higher current can flow and hence power more than the power limit can be supplied to the powered device.

In one of the embodiments, the first power-receiving circuit is a part of a PD controller. The PD controller also comprises a circuit which allows a PSE to detect whether the PoE device is capable of receiving power over Ethernet. In one of the embodiments, the second power-receiving circuit is a switch which can provide a current path through which higher current can flow and hence power more than the power limit can be received from the PSE.

BRIEF DESCRIPTION OF THE SEVERAL VIEWS OF THE DRAWING(S)

FIG. 1 illustrates one of the embodiments of present invention comprising high-power capable power over Ethernet (PoE) device that is capable of receiving high power and supplying high-power through Ethernet cables.

FIG. 2 is a flowchart illustrating the method of one of the embodiments of the present invention.

FIG. 3A is an illustration of the architecture of a high-power capable power sourcing equipment (HP-PSE) according to one of the embodiments.

FIG. 3B is an illustration of the architecture of a high-power capable powered device (HP-PD) according to one of the embodiments.

FIG. 3C is an illustration of the architecture of a high-power capable PoE device (HP-PSE-PD) according to one of the embodiments.

FIG. 4 is a flowchart illustrating the method of one of the embodiments of the present invention.

FIG. 5 illustrates a process of determining if a powered device or a power sourcing equipment is capable of receiving high power, or supplying high power respectively according to one of the embodiments.

FIG. 6 is a flowchart illustrating the method of one of the embodiments of the present invention.

FIG. 7 illustrates a detailed circuit schematic of a PoE system according to a prior art.

DETAILED DESCRIPTION OF THE INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "computer readable storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processing circuit(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A power sourcing equipment (PSE) supplies power through an Ethernet link to powered device(s) (PD). For example, a PSE can be a power over Ethernet (PoE) capable network switch, an intermediary device between a non-PoE network switch and a PoE device, or any network device that is capable of supplying power over an Ethernet link to another device.

A powered device (PD) is a device that is powered by a PSE through an Ethernet link. For example, a PD can be a wireless access point, IP phone, IP cameras or any network device that is capable of receiving power over an Ethernet link from another device.

In one of the embodiments, the amount of power drawn from a PSE is based on the amount of power the PD is capable of receiving, and not based on the amount of power the PSE is capable of supplying, provided that the PSE is capable of supplying power equal to or more than the amount of power the PD is capable of receiving.

According to IEEE 802.3af standard and IEEE 802.3at standard, maximum power supplied by a PSE is 15.4 watt and 34.2 watt respectively, and maximum power available at a PD is 12.95 watt and 25.5 watt respectively. The present invention relates to a PoE device that comprises one or more power-receiving circuit sections and one or more power-supply circuit sections. The power-supply circuit section(s) is capable of delivering higher power than maximum power delivered in the 802.3af standard or 802.3at standard. The power-receiving circuit section(s) is capable of receiving higher power than that delivered in the 802.3af standard or 802.3at standard.

FIG. 1 illustrates one of the embodiments of present invention comprising high-power capable PoE device that is capable of receiving high power and supplying high-power through Ethernet cables. For readability, the high-power capable PoE device is referred to as HP-PSE-PD; a PD that is capable of receiving high-power is referred to as HP-PD; a PSE that is capable of supplying high-power is referred to as HP-PSE. HP-PSE 101 supplies power to HP-PSE-PD 102 through Ethernet cable 115 via port 106. HP-PSE 101 can also be a power injector.

HP-PSE-PD 102 receives power via port 107 and supplies power to HP-PSE-PD 103 through Ethernet cable 116 via port 108. HP-PSE-PD 103 receives power via port 109 and supplies power to HP-PSE-PD 104 through Ethernet cable 117 via port 111 and supplies power to HP-PD 105 through Ethernet cable 118 via port 110. HP-PSE-PD 104 receives power via port 112 and supplies power viaport 113. HP-PD 105 receives power via port 114.

Ethernet cable 115, 116, 117, and 118 are preferred to be a CAT-5e cable with AWG26 or AWG24 in order to support the high power. The number of PoE devices an HP-PSE or an HP-PSE-PD can supply power to, depends on the power consumption of the PoE devices.

An HP-PSE-PD receives power by using its power-receiving circuit and supplies power by using its power-supply circuit. Therefore, HP-PSE-PD 102 receives power through its power-receiving circuit connecting to port 107 and supplies power through its power-supply circuit connecting to port 108.

The power-supply circuit comprises at least two sections. A first power-supply circuit section is for supplying power up to a first power limit, such as the power limit specified according to IEEE 802.3af standard and IEEE 802.3at standard. The second power-supply circuit section is for supplying power more than the first power limit. After an HP-PSE or HP-PSE-PD determines to supply more power than the first power limit, the HP-PSE or HP-PSE-PD does not use the first power-supply circuit section to supply the power, instead the HP-PSE or HP-PSE-PD uses the second power-supply circuit section to supply the power. After the HP-PSE or HP-PSE-PD determines not to supply more power than the first power limit, the HP-PSE or HP-PSE-PD does not use the second power-supply circuit section to supply the power, instead the HP-PSE or HP-PSE-PD uses the first power-supply circuit section to supply the power.

The power-receiving circuit also comprises at least two sections. The first power-receiving circuit section is for receiving power up to a first power limit, such as the power limit specified according to IEEE 802.3af standard or IEEE 802.3at standard. The second power-receiving circuit section is for receiving power more than the first power limit. In one of the embodiments, after an HP-PD or HP-PSE-PD determines to receive more power than the first power limit, the HP-PD or HP-PSE-PD does not use the first power-receiving circuit section to receive the power, instead the HP-PD or HP-PSE-PD uses the second power-receiving circuit section to receive the power. In one of the embodiments, after HP-PD or HP-PSE-PD determines not to receive more power than the first power limit, the HP-PD or HP-PSE-PD does not use the second power-receiving circuit section to receive the power, instead the HP-PD or HP-PSE-PD uses the first power-receiving circuit section to receive the power. In one of the embodiments, after HP-PD or HP-PSE-PD determines not to receive more power than the first power limit, the HP-PD or HP-PSE-PD does not use the first power-receiving circuit section to receive the power, instead the HP-PD or HP-PSE-PD uses the second power-receiving circuit section to receive the power.

After HP-PSE-PD 102 detects that a device is connected to one of its Ethernet ports configured for supplying power, such as port 108, it determines whether HP-PSE-PD 103 connected to port 108 is a PD or not, and can determine the power class of HP-PSE-PD 103 according to a standard, such as IEEE 802.3af standard or IEEE 802.3at standard. The determination is performed according to the standard. In one of the embodiments, after HP-PSE-PD 102 has determined that HP-PSE-PD 103 is a PD, HP-PSE-PD 102 determines whether HP-PSE-PD 102 should be allowed to supply more power than the power range specified in IEEE 802.3af standard or IEEE 802.3at standard to HP-PSE-PD 103. When HP-PSE-PD 102 determines that it should be allowed to supply more power to HP-PSE-PD 103, HP-PSE-PD 102 becomes capable of supplying HP-PSE-PD 103 more power than the amount of power specified in IEEE 802.3af standard or IEEE 802.3at standard. If HP-PSE-PD 102 determines that HP-PSE-PD 102 should not be allowed to supply more power to HP-PSE-PD 103, HP-PSE-PD 102 limits the amount of power that it supplies to HP-PSE-PD 103 to the amount of power specified in IEEE 802.3af standard or IEEE 802.3at standard. The same determination process also applies at HP-PSE 101 and HP-PSE-PDs 103 and 104.

According to one of the embodiments, when a device, such as HP-PSE 101, is connected to one of the Ethernet ports of HP-PSE-PD 102 configured for receiving power, such as port 107, HP-PSE-PD 102 determines whether HP-PSE-PD 102 should be allowed to draw more power than the power range specified in IEEE 802.3af standard or IEEE 802.3at standard from HP-PSE 101. When HP-PSE-PD 102 determines that it should be allowed to draw more power from HP-PSE 101, HP-PSE-PD 102 becomes capable of drawing more power from HP-PSE 101 than the amount of power specified in IEEE 802.3af standard or IEEE 802.3at standard. If HP-PSE-PD 102 determines that HP-PSE-PD 102 should not be allowed to draw more power from HP-PSE 101, HP-PSE-PD 102 limits the amount of power that that it draws from HP-PSE 101 to the amount of power specified in IEEE 802.3af standard or IEEE 802.3at standard. The same determination process also applies at HP-PD 105 and HP-PSE-PDs 103 and 104.

FIG. 3A is an illustration of the architecture of HP-PSE 350, according to one of the embodiments. HP-PSE 350 comprises processing circuit 352, device power circuit 351, PSE controller 355, HP-PSE switch 357, Ethernet PHY 385, Ethernet interface 362 and Ethernet transformer group 367. PSE controller 355 comprises a first power-supply circuit HP-PSE switch 357 is a second power-supply circuit. Device power circuit 351 is connected to an external electrical socket 370 through line 372. Processing circuit 352 receives power from device power circuit 351 through line 366. Line 356 connects device power circuit 351 to line 365 and line 358. PSE controller 355 receives power from device power circuit 351 through line 356 and 358. HP-PSE switch 357 receives power from device power circuit 351 through line 365 and 356. Processing circuit 352 can send a control signal to turn on or turn off HP-PSE switch 357 through signal 359. Powers is carried to the center tap of a transformer in Ethernet transformer group 367 from PSE controller 355 through lines 353 and 364, or from HP-PSE switch 357 through lines 354 and 364. Ethernet PHY 385 converts signals received from processing circuit 352 through signal 363 to Ethernet data and sends the Ethernet data to Ethernet transformer group 367 through signal 389. One or more wires in link 361 carries power and data through Ethernet transformer group 367 to Ethernet interface 362.

The function of device power circuit 351 is to supply power to processing circuit 352 and the rest of circuitries of HP-PSE 350. Alternatively, those skilled in the arts would appreciate that there are other techniques to supply power to rest of circuitries of HP-PSE 350, including supplying power through PSE controller 355 and HP-PSE switch 357, not through device power circuit 351.

According to one of the embodiments, electrical socket 370 is connected to PSE controller 355 and HP-PSE switch 357 through a line which carries power to PSE controller 355 through line 358 or to HP-PSE 357 through line 365. Therefore, line 356 is omitted.

According to one of the embodiments, HP-PSE 350 is connected to HP-PSE-PD 300 of FIG. 3C through Ethernet link 380.

FIG. 3B is an illustration of the architecture of HP-PD 330, according to one of the embodiments. HP-PD 330 comprises processing circuit 332, device power circuit 331, PD controller 333, HP-PD switch 334, Ethernet PHY 384, Ethernet interface 340 and Ethernet transformer group 336. PD controller 333 comprises a first power-receiving circuit. HP-PD switch 334 is a second power-receiving circuit. HP-PD 330 receives power from an HP-PSE or an HP-PSE-PD through Ethernet interface 340. Ethernet interface 340 is connected to Ethernet transformer group 336 through link 344. Link 344 comprises one or more wires carrying both data signals and power. Data signals pass from Ethernet transformer group 336 to Ethernet PHY 384 through signal 386 and then to processing circuit 332 through signal 335. Power is carried from the center tap of a transformer in Ethernet transformer group 336 to PD controller 333 through lines 341 and 342. Alternatively, power is carried from the center tap of a transformer in Ethernet transformer group 336 to HP-PD switch 334 through lines 341 and 343. Power is carried to device power circuit 331 from HP-PD switch 334 through lines 337 and 339 or from PD controller 333 through lines 345 and 339. Processing circuit 332 can send a control signal to turn on or turn off HP-PD switch 334 through signal 338. Processing circuit 332 receives power from device power circuit 331 through line 346.

According to one of the embodiments, HP-PD 330 is connected to HP-PSE-PD 300 of FIG. 3C through Ethernet link 381.

FIG. 3C is an illustration of the architecture of HP-PSE-PD 300, according to one of the embodiments. HP-PSE-PD 300 comprises power-supply circuit(s) and a power-receiving circuit(s) as shown in FIG. 3C. Processing circuit 302 performs functions of both processing circuits 332 and 352. Device power circuit 301 receives power from PD controller 303 through lines 315 and 329, or from HP-PD switch 304 through lines 327, 371 and 329. Processing circuit 302 receives power from device power circuit 301 through line 326. PD controller 303 comprises a first power-receiving circuit and performs the same function as PD controller 333. HP-PD switch 304 is a second power-receiving circuit and performs the same function as HP-PD switch 334. PSE controller 305 is a first power-supply circuit and performs the same function as PSE controller 355. HP-PSE switch 307 is a second power-supply circuit and performs the same function as HP-PSE switch 357. Ethernet transformer groups 306 and 336 perform the same function. Ethernet transformer groups 308 and 367 perform the same function. Ethernet interfaces 309 and 362 perform the same function. Ethernet interfaces 310 and 340 perform the same function. Lines 324, 323, and 322 perform the same function as links 354, 353, and 364 respectively. Lines 311, 312, 313, 329, 315, and 327 perform the same function as lines 341, 342, 343, 339, 345, and 337 respectively.

Signal 318 performs the same function as signal 359. Signal 314 performs the same function as signal 338. Signal 319 performs the same function as signal 363. Signal 325 performs the same function as signal 335. Signal 387 performs the same function as signal 389. Signal 388 performs the same function as signal 386. Link 320 performs the same function as link 361. Link 321 performs the same function as link 344.

Lines 315 and 371 carry power from PD controller 303 to line 316. Line 316 can carry power from PD controller 303 to PSE controller 305 through line 328 or to HP-PSE switch 307 through line 317. Line 316 is a connection between the power-supply circuit(s) of HP-PSE-PD 300 and the power-receiving circuit(s) of HP-PSE-PD 300.

HP-PD 304 supplies power to line 316 through line 327. Line 316 can carry power to PSE controller 305 from HP-PD switch 304 through line 328 or to HP-PSE switch 307 through line 317.

Ethernet link 380 is an Ethernet cable that connects HP-PSE 350 to HP-PSE-PD 300, and is used to carry power from HP-PSE 350 to HP-PSE-PD 300 and exchange data signals between HP-PSE 350 and HP-PSE-PD 300. Ethernet link 381 is an Ethernet cable that connects HP-PSE-PD 300 to HP-PD 330, and is used to carry power from HP-PSE-PD 300 to HP-PD 330 and exchange data signals between HP-PSE-PD 300 and HP-PD 330.

Those skilled in the art would appreciate that Ethernet PHYs 384, 383, 382 and 385 perform the same function. When signals arrive at an Ethernet PHY from a processing circuit, the Ethernet PHYs convert signals received from the processing circuit to Ethernet data, and the Ethernet data passes to an Ethernet transformer, which may be comprised in an Ethernet transformer group. Similarly, when Ethernet data arrives at the Ethernet PHY from the Ethernet transformer, the Ethernet PHY converts the Ethernet data to signals readable by the processing circuit, and sends the signals to the processing circuit. In one of the embodiments, the signals readable by the processing circuit, sent to and from the Ethernet PHY, are Reduced Gigabit Media Independent Interface (RGMII) signals.

Ethernet link 380 connects HP-PSE-PD 300 to HP-PSE 350, according to one of the embodiments. Ethernet link 381 connects HP-PSE-PD 300 to HP-PD 330, according to one of the embodiments.

According to one of the embodiments of the present invention, device power circuit 301 supplies power to HP-PSE switch 307 through line 317 and another line, or to PSE controller 305 through line 328 and the another line. Hence, HP-PSE switch 307 and PSE controller 305 receives power through device power circuit 301. Line 316 is omitted.

According to one of the embodiments of the present invention, HP-PD switch 304, HP-PSE switch 307, HP-PD switch 334 and HP-PSE switch 357 are field-effect transistors (FET), bipolar transistors, bipolar junction transistor (BJT) insulated-gate bipolar transistor (IGBT), metal-oxide-semiconductor FET (MOSFET), metal-semiconductor FET (MESFET), junction FET (JFET), carbon nanotube FET (CNTFET), high-electron-mobility transistor (HEMT), heterostructure insulated gate FET (HIGFET), modulation-doped FET (MODFET), nanoparticle organic memory FET (NOMFET), organic FET (OFET), vertical-slit FET (VeSFET), tunnel FET (TFET), relay, or any other type of switches that can support more than 25.5 watt passing through itself, and can be controlled by a processing circuit. The 25.5 watt is chosen according to IEEE 802.3at standard. In an alternative embodiment, the 25.5 watt value is changed to another power level that is higher than the power level supported by PSE controllers 355 and 305 or PD controllers 303 and 333. In an alternative embodiment, the 25.5 watt value is changed to a 12.95 watt value which is chosen according to IEEE 802.3af standard. In a preferred embodiment, HP-PD switch 304 and HP-PD switch 334 are p-channel MOSFETs, and HP-PSE switch 307 and HP-PSE switch 357 are n-channel MOSFET.

Program instructions executed by processing circuit 352 are stored in a computer readable storage medium comprised in HP-PSE 350. Program instructions executed by processing circuit 332 are stored in a computer readable storage medium comprised in HP-PD 330. Program instructions executed by processing circuit 302 are stored in a computer readable storage medium comprised in HP-PSE-PD 300.

In a preferred embodiment, PSE controller 355 and PSE controller 305 is an LTC4263-1 available from Linear Technology. In a preferred embodiment, PD controller 333 and PD controller 303 is an AS1135 available from Akros Silicon. In a preferred embodiment, Ethernet PHYs 384, 383, 382 and 385 are a VSC8601 available from Vitesse Semiconductor. In a preferred embodiment, Ethernet transformer groups 367, 306, 308, and 336 are G24105SK available from Magtek Technology.

Ethernet transformer groups 367, 306, 308 and 336 may represent a plurality of transformers according to one of the embodiments. For example, G24105SK available from Magtek Technology comprises four transformers. In one of the embodiments, Ethernet transformer groups 367, 306, 308 and 336, comprise two transformers each, such as Ethernet transformer 704 for transmitting data and Ethernet transformer 705 for receiving data, illustrated in FIG. 7. Ethernet transformers 704 and 705 belong to an Ethernet transformer group, such as Ethernet transformer group 308 or 367. Ethernet transformers 714 and 715 belong to an Ethernet transformer group, such as Ethernet transformer group 306 or 336.

FIG. 2 is a flowchart illustrating the method of one of the embodiments of the present invention and should be viewed in conjunction with FIG. 3A and FIG. 3C. FIG. 2 shows the operation of HP-PSE 350 according to one of the embodiments.

Taking HP-PSE 350 as an example, in step 201, device power circuit 351 of HP-PSE 350 receives power from electrical socket 370 through line 372. Device power circuit 351 supplies power to processing circuit 352 through line 366 and to rest of the components of HP-PSE 350 through line 356. HP-PSE-PD 300 is connected to HP-PSE 350 through Ethernet interface 362. In step 202, a detection circuit comprised in PSE controller 355 determines if HP-PSE-PD 300 is a PD. If it is determined that HP-PSE-PD 300 is not a PD, in step 203, HP-PSE 350 does not allow HP-PSE-PD 300 to draw power from HP-PSE 350 but allows sending and receiving of Ethernet data to and from HP-PSE-PD 300 through Ethernet link 380.

If it is determined that HP-PSE-PD 300 is a PD, in step 204, device power circuit 351 supplies power through PSE controller 355 to HP-PSE-PD 300. Power is carried from device power circuit 351 to PSE controller 355 through lines 356 and 358, to center tap of a transformer in Ethernet transformer group 367 through lines 353 and 364, to Ethernet interface 362 through link 361. Data signals sent from processing circuit 352 to Ethernet PHY 385 through signal 363, and converted to Ethernet data by Ethernet PHY 385, is sent to Ethernet interface 362 through Ethernet transformer group 367 and link 361, or vice versa. Therefore, power up to the first power limit can be supplied to HP-PSE-PD 300 through PSE controller 355.

In step 205, processing circuit 352 determines whether or not HP-PSE switch 357 should be turned on. If it is determined that HP-PSE switch 357 should not be turned on, in step 208, HP-PSE 350 continues supplying power equal up to the first power limit to HP-PSE-PD 300.

In one of the embodiments, in step 205, the determination of whether HP-PSE switch 357 should be turned on or not is based on, in part, the link status of Ethernet link 380 at Ethernet interface 362. After the link status becomes stable, processing circuit 352 determines to turn on HP-PSE switch 357. If the link status does not become stable, processing circuit 352 determines not to turn on HP-PSE switch 357.

In one of the embodiments, in step 205, the determination of whether HP-PSE switch 357 should be turned on or not, is based on the power level that the device connected at Ethernet interface 362 is capable of receiving. For example, if it is determined by processing circuit 352 that HP-PSE-PD 300 connected at Ethernet interface 362 is capable of receiving high power, processing circuit 352 determines to turn on HP-PSE switch 357. If it is determined by processing circuit 352 that HP-PSE-PD 300 connected at Ethernet interface 362 is not capable of receiving high power, processing circuit 352 determines not to turn on HP-PSE switch 357.

If processing circuit 352 determines to turn on HP-PSE switch 357, in step 206: processing circuit 352 sends a control signal to turn on HP-PSE switch 357 through signal 359; a power circuit in PSE controller 355 is then not used to supply power to HP-PSE-PD 300; device power circuit 351 supplies power to HP-PSE-PD 300 through HP-PSE switch 357, Ethernet transformer group 367, Ethernet interface 362 and Ethernet link 380. Ethernet link 380 carries power applied at the center tap of a transformer in Ethernet transformer group 367 from HP-PSE switch 357 and differentially carries Ethernet data passed by Ethernet transformer group 367 from Ethernet PHY 385 through link 361 to Ethernet interface 362. Turning on HP-PSE switch 357 allows HP-PSE 350 to supply power more than the first power limit to HP-PSE-PD 300 as HP-PSE switch 357 provides a current path through which higher current can flow from device power circuit 351 through HP-PSE switch 357 and line 364. Hence, high power can be supplied to HP-PSE-PD 300 through Ethernet link 380.

In step 207, processing circuit 352 determines if it should maintain turning on HP-PSE switch 357. If it is determined that processing circuit 352 should maintain turning on HP-PSE switch 357, HP-PSE switch 357 continues to be turned on. If it is determined that processing circuit 352 should not maintain turning on HP-PSE switch 357, in step 208, processing circuit 352 sends a control signal through signal 359 to turn off HP-PSE switch 357. In one of the embodiments, the decision to determine if processing circuit 352 should maintain turning on HP-PSE switch 357 or not, is according to the link-status of Ethernet link 380 at Ethernet interface 362. Processing circuit 352 monitors and makes the decision at step 207. If the link-status of Ethernet link is stable, HP-PSE switch 357 is maintained to be turned on. If the link-status of Ethernet link becomes unstable or off, HP-PSE switch 357 will be turned off in step 208.

In one of the embodiments of the present invention, in step 204 and step 206, power is supplied to PSE controller 355 and HP-PSE switch 357, respectively, from electrical socket 370 directly through a line and line 356 is omitted.

In one of the embodiments, HP-PSE switch 357 can be turned on manually by the user of HP-PSE 350, in order to provide a current path through which higher current can flow. The user can turn on HP-PSE switch 357 manually by using a switch controlled through a knob, button, webpage, user interface, application programming interface, console port, display module on HP-PSE 350, or any other interface that can be used to provide a user's input to HP-PSE 350.

In one of the embodiments of the present invention, HP-PSE switch 357 is maintained to be turned on by default regardless of whether HP-PSE-PD 300 is capable of receiving high power or not. This is possible because HP-PSE-PD 300 should not draw power more than it can handle, and thus does not get damaged even if HP-PSE switch 357 provides a current path through which higher current can flow. However, turning on HP-PSE switch 357 by default may be a safety hazard, since if HP-PSE-PD 300 has a defect, HP-PSE-PD 300 may draw power more than it can handle and may cause damage. If, at step 202, PSE controller 355 wrongly determines that HP-PSE-PD 300 is a PD, and HP-PSE-PD 300 is actually not a PD, then turning on HP-PSE switch 357 by default will damage HP-PSE-PD 300. This is because HP-PSE switch 357 does not have detection capability to distinguish between a non-PoE device and a PD, like PSE controller 355 does.

FIG. 6 is a flowchart illustrating the method of one of the embodiments of the present invention and should be viewed in conjunction with FIG. 3B and FIG. 3C. FIG. 6 shows the operation of HP-PD 330 according to one of the embodiments.

Taking HP-PD 330 as an example, in step 601, HP-PD 330 receives power and Ethernet data from HP-PSE-PD 300 through Ethernet link 381 and Ethernet interface 340; the power and Ethernet data are carried to Ethernet transformer group 336 through link 344; Ethernet data passes from Ethernet transformer group 336 through signal 386 to Ethernet PHY 384 which converts the Ethernet data into data signals readable by processing circuit 332 and sends the data signals to processing circuit 332 through signal 335. Power is carried from the center tap of a transformer in Ethernet transformer group 336 to PD controller 333 through lines 341 and 342 to device power circuit 331 through lines 345 and 339; device power circuit 331 supplies the power to processing circuit 332 through line 346. The power received from HP-PSE-PD 300 is up to the first power limit.

In step 602, processing circuit 332 determines whether or not HP-PD switch 334 should be turned on. If it is determined that HP-PD switch 334 should not be turned on in step 605, HP-PD switch 334 is not turned on, and HP-PD 330 continues receiving power up to the first power limit from HP-PSE-PD 300.

If it is determined that HP-PD switch 334 should be turned on, in step 603: processing circuit 332 sends a control signal through signal 338 to turn on HP-PD switch 334; PD controller 333 is then not used to supply power to device power circuit 331; power is carried to HP-PD switch 334 from the center tap of a transformer in Ethernet transformer group 336 through lines 341 and 343; HP-PD switch 334 supplies power to device power circuit 331 through lines 337 and 339. HP-PD 330 becomes capable of receiving power more than the first power limit from HP-PSE-PD 300 as HP-PD switch 334 provides a current path through which higher current can flow from Ethernet transformer group 336 to line 343 to HP-PD switch 334 to line 337.

In one of the embodiments, the determination of whether HP-PD switch 334 should be turned on or not is based on, in part, the link status of Ethernet link 381 at Ethernet interface 340. After the link status becomes stable, processing circuit 332 determines to turn on HP-PD switch 334. If the link status does not become stable or is off, processing circuit 332 determines not to turn on HP-PD switch 334.

In one of the embodiments, in step 602, the determination of whether HP-PD switch 334 should be turned on or not, is based on, in part, the power level that the device connected at Ethernet interface 340 is capable of supplying. For example, if it is determined by processing circuit 332 that HP-PSE-PD 300 connected at Ethernet interface 340 is capable of supplying high power, processing circuit 332 determines to turn on HP-PD switch 334. If it is determined by processing circuit 332 that HP-PSE-PD 300 connected at Ethernet interface 340 is not capable of supplying high power, processing circuit 332 determines not to turn on HP-PD switch 332.

In step 604, processing circuit 332 determines if it should maintain turning on HP-PD switch 334. If it is determined that processing circuit 332 should maintain turning on HP-PD switch 334, HP-PD switch 334 continues to be turned on. If it is determined that processing circuit 332 should not maintain turning on HP-PD switch 334, in step 605, processing circuit 332 sends a control signal through signal 338 to turn off HP-PD switch 334. When HP-PD 334 is turned off, HP-PD 330 can receive power up to the first power limit from HP-PSE-PD 300. In one of the embodiments, processing circuit 332 keeps monitoring the link-status of Ethernet link 381 at Ethernet interface 340 at step 604 to determine if it should maintain turning on HP-PD switch 334. If the link-status of Ethernet link is stable, processing circuit 332 maintains turning on HP-PD switch 334. If the link-status of Ethernet link becomes unstable or off, HP-PSE switch 334 is turned off in step 605.

In one of the embodiments, HP-PD switch 334 can be turned on manually by the user of HP-PD 330, in order to provide a current path through which higher current can flow. The user can turn on HP-PD switch 334 manually by using a switch controlled through a knob, button, webpage, user interface, application programming interface, console port, display module on HP-PD 330, or any other interface that can be used to provide a user's input to HP-PD 330.

According to a preferred embodiment of the present invention, there is no need to perform the processes in FIG. 6 as HP-PD switch 334 is maintained to be turned on by default. This is possible because HP-PD switch 334 is capable of providing a current path through which current can flow from Ethernet transformer group 336 to line 343 to HP-PD switch 334 to line 337 without damaging the device power circuit 331. Therefore HP-PD switch 334 is not necessarily connected to processing circuit 332 through signal 338. However, turning on HP-PD switch 334 by default may be a safety hazard, since if HP-PSE-PD 300 has a defect, HP-PD 330 may draw more power from HP-PSE-PD 300 than HP-PSE-PD 300 is capable of supplying, and cause damage to HP-PSE-PD 300. Also, if HP-PD switch 334 is turned on by default, PD controller 333 is not used to receive power. When PD controller 333 is not being used, HP-PSE-PD 300 cannot detect if HP-PD 330 is a PD or not, and therefore power will not be supplied to HP-PD 300 by HP-PSE-PD 300.

FIG. 4 is an illustration of one of the embodiments of the present invention and needs to be viewed in conjunction with FIG. 3A, FIG. 3B, and FIG. 3C for a better understanding of the embodiment. In step 401, HP-PSE-PD 300 draws power up to the first power limit from HP-PSE 350 through PD controller 303. In step 402, processing circuit 302 determines whether or not HP-PD switch 304 should be turned on. Step 402 performs the same function as step 602.

In one of the embodiments, in step 402, the determination of whether HP-PD switch 304 should be turned on or not is based on, in part, the link status of Ethernet link 380 at Ethernet interface 310. After the link status becomes stable, processing circuit 302 determines to turn on HP-PD switch

304. If the link status does not become stable or is off, processing circuit 302 determines not to turn on HP-PD switch 304.

In one of the embodiments, in step 402, the determination of whether HP-PD switch 304 should be turned on or not, is based on the power level that the device connected at Ethernet interface 310 is capable of supplying. For example, if it is determined by processing circuit 302 that HP-PSE 350 connected at Ethernet interface 310 is capable of supplying power more than the first power limit, processing circuit 302 determines to turn on HP-PD switch 304. If it is determined by processing circuit 302 that HP-PSE 350 connected at Ethernet interface 310 is not capable of supplying power more than the first power limit, processing circuit 302 determines not to turn on HP-PD switch 304.

If it is determined that HP-PD switch 304 should not be turned on, in step 411: HP-PSE-PD 300 continues drawing power up to a first power limit from HP-PSE 350; PD controller 303 receives the power through the center tap of Ethernet transformer group 306 and lines 311 and 312, and supplies the power to PSE controller 305 through lines 315, 371, 316 and 328 and to device power circuit 301 through lines 315 and 329. In step 412, processing circuit 302 determines if HP-PD 330 is connected to HP-PSE-PD 300 through Ethernet interface 309. If HP-PD 330 is not connected, processing circuit 302 continues checking if any device is connected to HP-PSE-PD 300 through Ethernet interface 309. If HP-PD 330 is connected, in step 413, a detection circuit comprised in PSE controller 305 determines if HP-PD 330 is a PD. If it is determined that HP-PD 330 is a PD, HP-PSE-PD 300 supplies power up to a first power limit to HP-PD 330 in step 415. If it is determined that HP-PD 330 is a not PD, in step 414, no power is supplied to HP-PD 330 and only Ethernet data is exchanged between HP-PSE-PD 300 and HP-PD 330.

If it is determined that HP-PD switch 304 should be turned on, in step 403: processing circuit 302 sends a control signal to turn on HP-PD switch 304 through signal 314; PD controller 303 is then not used to supply power to device power circuit 301 or PSE controller 305; power is carried to HP-PD switch 304 from the center tap of a transformer in Ethernet transformer group 306 through lines 311 and 313; HP-PD switch 304 supplies power to device power circuit 301 through lines 327, 371 and 329, and to PSE controller 305 through lines 316 and 328. HP-PSE-PD 300 becomes capable of receiving power more than the first power limit from HP-PSE 350 as HP-PD switch 304 provides a current path through which higher current can flow from Ethernet transformer group 306 to line 313 to HP-PD switch 304 to line 327.

In one of the embodiments, HP-PD switch 304 can be turned on manually by the user of HP-PSE-PD 300, in order to provide a current path through which higher current can flow. The user can turn on HP-PD switch 304 manually by using a switch controlled through a knob, button, webpage, user interface, application programming interface, console port, display module on HP-PSE-PD 300, or any other interface that can be used to provide a user's input to HP-PSE-PD 300.

In step 404, processing circuit 302 determines if HP-PD 330 is connected through Ethernet interface 309. If HP-PD 330 is not connected, processing circuit 302 continues checking if any device is connected to HP-PSE-PD 300 through Ethernet interface 309. If HP-PD 330 is connected, in step 405, a detection circuit comprised in PSE controller 305 determines if HP-PD 330 is a PD. If it is determined that HP-PD 330 is a not PD, in step 414, no power is supplied to HP-PD 330 and only Ethernet data is exchanged between HP-PSE-PD 300 and HP-PD 330 through Ethernet link 381. If it is determined that HP-PD 330 is a PD, in step 406, power up to a first power limit is supplied to HP-PD 330 and processing circuit 302 determines whether or not HP-PSE switch 307 should be turned on. Step 406 has the same function as step 205. If it is determined that HP-PD switch 304 should not be turned on, in step 415: PSE controller 305 continues drawing power up to a first power limit from HP-PD switch 304 through link 327, 316, and 328 or from device power circuit 301; power is carried to the center tap of a transformer in Ethernet transformer group 308 from PSE controller 305 through lines 323 and 322, and Ethernet data is carried to Ethernet transformer group 308 from Ethernet PHY 383 through signal 387; Ethernet data and power is carried to Ethernet interface 309 through link 320 and thus HP-PSE-PD 300 supplies power up to a first power limit to HP-PD 330 through Ethernet interface 309 and Ethernet link 381.

If, in step 406, it is determined that HP-PSE switch 307 should be turned on, in step 407, processing circuit 302 sends a control signal through signal 318 to turn on HP-PSE switch 307 and HP-PD switch 304 supplies power to HP-PSE switch 307 through lines 327, 316 and 317. PSE controller 305 is then not used to supply power to Ethernet transformer group 308; power more than the first power limit is carried to the center tap of a transformer in Ethernet transformer group 308 through lines 324 and 322 and Ethernet data is carried to Ethernet transformer group 308 from Ethernet PHY 383 through signal 387; Ethernet data and power is carried to Ethernet interface 309 through link 320 and thus HP-PSE-PD 300 supplies power more than the first power limit to HP-PD 330 through Ethernet interface 309 and Ethernet link 381. Thus, HP-PSE-PD 300 becomes capable of supplying power more than the first power limit to HP-PD 330 as HP-PSE switch 307 provides a current path through which higher current can flow from line 316 to line 317 to HP-PSE switch 307 to line 324 to line 322 to Ethernet transformer group 308 to Ethernet interface 309.

In one of the embodiments, in step 406, the determination of whether HP-PSE switch 307 should be turned on or not is based on the link status of Ethernet link 381 at Ethernet interface 309. After the link status becomes stable, processing circuit 302 determines to turn on HP-PSE switch 307. If the link status does not become stable or is off, processing circuit 302 determines not to turn on HP-PSE switch 307.

In one of the embodiments, in step 406, the determination of whether HP-PSE switch 307 should be turned on or not, is based on the power level that the device connected at Ethernet interface 309 is capable of receiving. For example, if it is determined by processing circuit 302 that HP-PD 330 connected at Ethernet interface 309 is capable of receiving high power, processing circuit 302 determines to turn on HP-PSE switch 307. If it is determined by processing circuit 302 that HP-PD 330 connected at Ethernet interface 309 is not capable of receiving high power, processing circuit 302 determines not to turn on HP-PSE switch 307.

In one of the embodiments, HP-PSE switch 307 can be turned on manually by the user of HP-PSE-PD 300, in order to provide a current path through which higher current can flow. The user can turn on HP-PSE switch 307 manually by using a switch controlled through a knob, button, webpage, user interface, application programming interface, console port, display module on HP-PSE-PD 300, or any other interface that can be used to provide a user's input to HP-PSE-PD 300.

In step 408, processing circuit 302 determines if it should maintain turning on HP-PSE switch 307. If it is determined that processing circuit 302 should maintain turning on HP-PSE switch 307, HP-PSE switch 307 continues to be turned on. If it is determined that processing circuit 302 should not maintain turning on HP-PSE switch 307, in step 409, processing circuit 302 sends a control signal through signal 318 to turn off HP-PSE switch 307. When HP-PSE switch 307 is turned off, HP-PSE-PD 300 can supply power up to the first power limit to HP-PD 330 through PSE controller 305. In one of the embodiments, to determine if it should maintain turning on HP-PSE switch 307, processing circuit 302 keeps monitoring the link-status of Ethernet link 381 at Ethernet interface 309 at step 408. If the link-status of Ethernet link is stable, HP-PSE switch 307 continues to be turned on. If the link-status of Ethernet link becomes unstable or off, HP-PSE switch 307 is turned off in step 409. Processing circuit 302 continues checking if any device is plugged in to HP-PSE-PD 300 through Ethernet interface 309 in step 404.

FIG. 5 illustrates a process of determining if a PD or a PSE is capable of receiving high power, or supplying high power respectively according to one of the embodiments. The process of FIG. 5 comprises a communication protocol between a PD and a PSE. The communication protocol can be any protocol that can be used to identify if a PD is capable of receiving high power and if a PSE is capable of supplying high power. It would be apparent to those skilled in the art that there are many ways to establish such communication.

In one of the embodiments, when determining if a PD is capable of receiving high power, in step 511, a first HP-PSE sends a first message to a first PD through a first Ethernet cable. In step 512, processing circuit of the first HP-PSE determines if a message sent back from the first PD is an expected message. If the message sent back from the first PD is an expected message, it is concluded that the first PD is capable of receiving high power in step 514. The receiving of the expected message is a first indication for the processing circuit of the first HP-PSE that the first PD is capable of receiving high power. If no message is sent back from the first PD, or the message sent back from the first PD is not an expected message, and it is concluded in step 513 that the first PD is not capable of receiving high power. Step 205 of FIG. 2 and step 406 of FIG. 4 may be conducted using this process. In one of the embodiments, step 511 is conducted after step 514 instead of being conducted before step 512.

In one of the embodiments, step 511 is omitted; when the first HP-PSE is connected to the first PD through the first Ethernet cable, in step 512, processing circuit of the first HP-PSE determines if a message sent by the first PD is an expected message. Step 205 of FIG. 2 and step 406 of FIG. 4 may be conducted using this process.

The first HP-PSE can be an HP-PSE or an HP-PSE-PD. The first PD can be a PD, HP-PD, HP-PSE-PD or PSE-PD.

In one of the embodiments of the present invention, when determining if a PSE is capable of supplying high power, in step 511, a second HP-PD sends a second message to a second PSE through a second Ethernet interface. In step 512 a processing circuit of the second HP-PD determines if a third message sent back from the second PSE is an expected message. If the third message sent back from the second PSE is an expected message, it is determined that the second PSE is capable of supplying high power in step 514. If no third message is sent back from the second PSE, or the third message sent back from the second PSE is not an expected message, it is determined that the second PSE is not capable of supplying high power in step 513. Step 602 of FIG. 6 and step 402 of FIG. 4 may be conducted using this process.

The second HP-PD can be an HP-PD or an HP-PSE-PD. The second PSE can be a PSE, HP-PSE, HP-PSE-PD, or PSE-PD.

In one of the embodiments, the first PD and the second HP-PD described may refer to the same device. The first HP-PSE and the second PSE described may refer to the same device.

The invention claimed is:

1. A method, performed in a first power sourcing equipment (PSE) comprising at least one power-supply circuit, for supplying power over Ethernet to a first powered device (PD), the method comprising:
    (a) supplying power to the first PD using a first power-supply circuit after determining that the first PD is capable of receiving power over Ethernet; wherein the first power-supply circuit is comprised in a PSE controller of the first PSE and is capable of supplying power up to a first power limit, wherein the first power limit is set according to IEEE802.3at standard or IEEE802.3af standard;
    (b) determining to continue using the first power-supply circuit or to use a second power-supply circuit to supply power to the first PD based, at least in part, on a first indication; wherein the second power-supply circuit is capable of supplying power more than the first power limit and the second power-supply circuit is used by turning on a high-power PSE (HP-PSE) switch; wherein the first indication is used for indicating whether the first PD is capable of receiving power more than the first power limit and is based, at least in part, on one or more of (i) receiving a first expected message from the first PD, (ii) a link status of an Ethernet link connecting the first PSE to the first PD becoming stable, and (iii) a manual switch status indicating that an instruction has been received from a user to use the second power-supply circuit, wherein the manual switch status can be controlled through a knob, button, webpage, user interface, application programming interface, console port, or display module;
    (c) using the second power-supply circuit instead of using the first power-supply circuit to supply power after it is determined that the first PD is capable of receiving power more than the first power limit;
    (d) determining whether or not to continue using the second power-supply circuit based on the link status;
    (e) if the link status is unstable, turning off the HP-PSE switch and using the first power-supply circuit for supplying power to the first PD.

2. According to the method of claim 1, further comprising sending a second message to the first PD, wherein the second message is to indicate that the first PSE is capable of supplying power more than the first power limit, wherein the second message is sent before or after receiving the first message.

3. According to the method of claim 1, wherein the second power-supply circuit comprising the HP-PSE switch, wherein the HP-PSE switch is selected from a group consisting of a field-effect transistor (FET), a bipolar transistor, an insulated-gate bipolar transistor (IGBT), a metal-oxide-semiconductor FET (MOSFET), a metal-semiconductor FET (MESFET), a junction FET (JFET), and a relay.

4. According to the method of claim 1, wherein the first PSE comprises:
    a second Ethernet interface, a second Ethernet transformer group, a second Ethernet physical transceiver (Ethernet PHY), the first PSE controller and the HP-PSE switch; wherein the second Ethernet transformer group connects to the second Ethernet PHY, the second Ethernet interface and the first PSE controller and the HP-PSE switch respectively; and wherein the second Ethernet transformer group is connected to the second Ethernet PHY, the second Ethernet interface and a joint connection of the first PSE controller and the HP-PSE switch respectively.

5. A method, performed in a first powered device (PD) comprising at least one power-receiving circuit, for receiving power over Ethernet from a first power sourcing equipment (PSE), the method comprising:
  (a) receiving power from the first PSE using a first power-receiving circuit; wherein the first power-receiving circuit is comprised in a PD controller of the first PD and is capable of receiving power up to a first power limit; wherein the first power limit is set according to IEEE802.3at standard or IEEE802.3af standard;
  (b) determining to continue using the first power-receiving circuit or to use a second power-receiving circuit based, at least in part, on a first indication, wherein the second power-receiving circuit is capable of receiving power more than the first power limit and the second power-receiving circuit is used by turning on a high-power PD (HP-PD) switch; wherein the first indication is used for indicating whether the first PSE is capable of supplying power more than the first power limit and is based, at least in part, on one or more of (i) receiving a first expected message from the first PSE, (ii) a link status of an Ethernet link connecting the first PD to the first PSE becoming stable, and (iii) a manual switch status indicating that an instruction has been received from a user to use the second power-receiving circuit, wherein the manual switch status can be controlled through a knob, button, webpage, user interface, application programming interface, console port, or display module;
  (c) using the second power-receiving circuit instead of using the first power-receiving circuit to receive power after it is determined that the first PSE is capable of supplying power more than the first power limit;
  (d) determining whether or not to continue using the second power-receiving circuit based on the link status;
  (e) if the link status is unstable, turning off the HP-PD switch and using the first power-receiving circuit for receiving power from the first PSE.

6. According to the method of claim 5, further comprising sending a second message to the first PSE, wherein the second message is to indicate that the first PD is capable of receiving power more than the first power limit, wherein the second message is sent before or after receiving the first message.

7. According to the method of claim 5, wherein the second power receiving circuit comprising the HP-PD switch, wherein the HP-PD switch is selected from a group consisting of a field-effect transistor (FET), a bipolar transistor, an insulated-gate bipolar transistor (IGBT), a metaloxide-semiconductor FET (MOSFET), a metal-semiconductor FET (MESFET), a junction FET (JFET) and a relay.

8. According to the method of claim 5, wherein the first PD comprises:
  a first Ethernet interface, a first Ethernet transformer group, a first Ethernet physical transceivers (Ethernet PHY), the first PD controller and the HP-PD switch; wherein the first Ethernet transformer group connects to the first Ethernet PHY, the first Ethernet interface and a joint connection of first PD controller and the HP-PD switch respectively; and wherein the first Ethernet transformer group is connected to the first Ethernet PHY, the first Ethernet interface and the first PD controller and the HP-PD switch respectively.

9. A method, performed in a network device comprising a first power receiving circuit, a second power-receiving circuit, a first power-supply circuit and a second power-supply circuit, for receiving and supplying power over Ethernet, the method comprising:
  (a) receiving power from a first power sourcing equipment (PSE) using the first power-receiving circuit; wherein, the first power-receiving circuit is comprised in a powered device (PD) controller of the network device and is capable of receiving power up to a first power limit; wherein the first power limit is set according to IEEE802.3at standard or IEEE802.3af standard;
  (b) determining to continue using the first power-receiving circuit or using the second power-receiving circuit based, at least in part, on a first indication; wherein the second power-receiving circuit is capable of receiving power more than the first power limit and the second power-receiving circuit is used by turning on a high-power PD (HP-PD) switch; wherein the first indication is used for indicating whether the first PSE is capable of supplying power more than the first power limit and is based, at least in part, on one or more of (i) receiving a first expected message from the first PSE, (ii) a first link status of an Ethernet link connecting the network device to the first PSE becoming stable, and (iii) a first manual switch status indicating that an instruction has been received from a user to use the second power-receiving circuit, wherein the first manual switch status can be controlled through a knob, button, webpage, user interface, application programming interface, console port, or display module;
  (c) using the second power-receiving circuit instead of using the first power-receiving circuit to receive power after it is determined that the first PSE is capable of supplying power more than the first power limit;
  (d) determining whether or not to continue using the second power-receiving circuit based on the first link status;
  (e) if the first link status is unstable, turning off the HP-PD switch and using the first power-receiving circuit for receiving power from the first PSE;
  (f) supplying power to a first PD using the first power-supply circuit after determining the first PD is capable of receiving power over Ethernet; wherein the first power-supply circuit is comprised in a PSE controller of the network device and is capable of supplying power up to the first power limit;
  (g) determining to continue using the first power-supply circuit or to use a second power-supply circuit to supply power to the first PD based, at least in part, on a second indication, wherein the second power-supply circuit is capable of supplying power more than the first power limit and the second power-supply circuit is used by turning on a high-power PSE (HP-PSE) switch; wherein the second indication is used for indicating whether the first PD is capable of receiving power more than the first power limit and is based, at least in part, on one or more of (i) receiving a second expected message from the first PD, (ii) a second link status of an Ethernet link connecting the network device to the first PD becoming stable, and (iii) a second manual switch status indicating that an instruction has been received from a user to use the second power-supply circuit; wherein second manual switch status can be controlled through a knob, button, webpage, user interface, application programming interface, console port, or display module;

(h) using the second power-supply circuit instead of using the first power-supply circuit to supply power after it is determined that the first PD is capable of receiving power more than the first power limit (i) determining whether or not to continue using the second power-supply circuit based on the second link status;

(j) if the second link status is unstable, turning off the HP-PSE switch and using the first power-supply circuit for supplying power to the first PD.

10. According to claim 9, wherein when the network device is not supplied with power more than the first power limit by the first PSE, the network device does not supply power more than the first power limit to the first PD.

11. According to the method of claim 9, further comprising sending a third message to the first PSE, wherein the third message is to indicate that the network device is capable of receiving power more than the first power limit, wherein the third message is sent before or after receiving the first message.

12. According to the method of claim 9, wherein the second power receiving circuit comprising the HP-PD switch, wherein the HP-PD switch is selected from a group consisting of a field-effect transistor (FET), a bipolar transistor, an insulated-gate bipolar transistor (IGBT), a metal-oxide-semiconductor FET (MOSFET), a metal-semiconductor FET (MESFET), a junction FET (JFET) and a relay.

13. According to the method of claim 9, further comprising sending a fourth message to the first PD, wherein the fourth message is to indicate that the network device is capable of supplying power more than the first power limit, wherein the fourth message is sent before or after receiving the third message.

14. According to the method of claim 9, wherein the second power-supply circuit comprising the HP-PSE switch, wherein the HP-PSE switch is selected from a group consisting of a field-effect transistor (FET), a bipolar transistor, an insulated-gate bipolar transistor (IGBT), a metal-oxide-semiconductor FET (MOSFET), a metal-semiconductor FET (MESFET), a junction FET (JFET) and a relay.

15. According to the method of claim 9,
wherein the network device comprises: a first Ethernet interface, a first Ethernet transformer group, a first Ethernet physical transceiver (Ethernet PHY), the first PD controller and the HP-PD switch; wherein the Ethernet transformer group connects to the first Ethernet PHY, the first Ethernet interface and a joint connection of the first PD controller and the HP-PD switch respectively; wherein the first Ethernet transformer group is connected to the first Ethernet PHY, the first Ethernet interface and the first PD controller and the HP-PD switch respectively;
wherein the network device further comprises: a second Ethernet interface, a second Ethernet transformer group, a second Ethernet physical transceivers (Ethernet PHY), the first PSE controller and the HP-PSE switch; wherein the second Ethernet transformer group connects to the second Ethernet PHY, the second Ethernet interface and the first PSE controller and the HP-PSE switch respectively; and wherein the second Ethernet transformer group is connected to the second Ethernet PHY, the second Ethernet interface and a joint connection of the first PSE controller and the HP-PSE switch respectively.

16. A system comprising a first power sourcing equipment (PSE) for supplying power over Ethernet, wherein the first PSE comprising:
a PSE controller comprising a first power-supply circuit capable of supplying power up to a first power limit to a first powered device (PD); wherein the first power limit is set according to IEEE802.3at standard or IEEE802.3af standard;
a second power-supply circuit capable of supplying power more than the first power limit;
at least one processing circuit executing program instructions for:
(a) supplying power to the first PD using the first power-supply circuit after determining that the first PD is capable of receiving power over Ethernet;
(b) determining to continue using the first power-supply circuit or to use a second power-supply circuit to supply power to the first PD based, at least in part, on a first indication; wherein the second power-supply circuit is used by turning on a high-power PSE (HP-PSE) switch; wherein the first indication is used for indicating whether the first PD is capable of receiving power more than the first power limit and is based, at least in part, on one or more of (i) receiving a first expected message from the first PD, (ii) a link status of an Ethernet link connecting the first PSE to the first PD becoming stable, and (iii) a manual switch status indicating that an instruction has been received from a user to use the second power-supply circuit, wherein the manual switch status can be controlled through a knob, button, webpage, user interface, application programming interface, console port, or display module;
(c) using the second power-supply circuit instead of using the first power-supply circuit to supply power after it is determined that the first PD is capable of receiving power more than the first power limit;
(d) determining whether or not to continue using the second power-supply circuit based on the link status;
(e) if the link status is unstable, turning off the HP-PSE switch and using the first power-supply circuit for supplying power to the first PD.

17. According to the system of claim 16, further comprising sending a second message to the first PD, wherein the second message is to indicate that the first PSE is capable of supplying power more than the first power limit, wherein the second message is sent before or after receiving the first message.

18. According to the system of claim 16, wherein the second power-supply circuit comprising the HP-PSE switch, wherein the HP-PSE switch is selected from a group consisting of a field-effect transistor (FET), a bipolar transistor, an insulated-gate bipolar transistor (IGBT), a metal-oxide-semiconductor FET (MOSFET), a metal-semiconductor FET (MESFET), a junction FET (JFET), and a relay.

19. According to the system of claim 16, wherein the first PSE further comprises:
a second Ethernet interface, a second Ethernet transformer group, and a second Ethernet physical transceivers (Ethernet PHY); wherein the second Ethernet transformer group connects to the second Ethernet PHY, the second Ethernet interface and the first PSE controller and the HP-PSE switch respectively; and wherein the second Ethernet transformer group is connected to the second Ethernet PHY, the second Ethernet interface and a joint connection of the first PSE controller and the HP-PSE switch respectively.

20. A system comprising a first powered device (PD) for receiving power over Ethernet from a first power sourcing equipment (PSE), wherein the first PD comprising:
- a PD controller comprising a first power-receiving circuit capable of receiving power up to a first power limit; wherein the first power limit is set according to IEEE802.3at standard or IEEE802.3af standard;
- a second power-receiving circuit capable of receiving power more than the first power limit;
- at least one processing circuit executing program instructions for:
  (a) receiving power from the first PSE using the first power-receiving circuit;
  (b) determining to continue using the first power-receiving circuit or to use a second power-receiving circuit based, at least in part, on a first indication, wherein the second power-receiving circuit is used by turning on a high-power PD (HP-PD) switch; wherein the first indication is used for indicating whether the first PSE is capable of supplying power more than the first power limit and is based, at least in part, on one or more of (i) receiving a first expected message from the first PSE, (ii) a link status of an Ethernet link connecting the first PD to the first PSE becoming stable, and (iii) a manual switch status indicating that an instruction has been received from a user to use the second power-receiving circuit, wherein the manual switch status can be controlled through a knob, button, webpage, user interface, application programming interface, console port, or display module;
  (c) using the second power-receiving circuit instead of using the first power-receiving circuit to receive power after it is determined that the first PSE is capable of supplying power more than the first power limit;
  (d) determining whether or not to continue using the second power-receiving circuit based on the link status;
  (e) if the link status is unstable, turning off the HP-PD switch and using the first power-receiving circuit for receiving power from the first PSE.

21. According to the system of claim 20, further comprising sending a second message to the first PSE, wherein the second message is to indicate that the first PD is capable of receiving power more than the first power limit, wherein the second message is sent before or after receiving the first message.

22. According to the system of claim 20, wherein the second power receiving circuit comprising the HP-PD switch, wherein the HP-PD switch is selected from a group consisting of a field-effect transistor (FET), a bipolar transistor, an insulated-gate bipolar transistor (IGBT), a metaloxide-semiconductor FET (MOSFET), a metal-semiconductor FET (MESFET), a junction FET (JFET), and a relay.

23. According to the system of claim 20, wherein the first PD further comprises:
- a first Ethernet interface, a first Ethernet transformer group, and a first Ethernet physical transceiver (Ethernet PHY), wherein the first Ethernet transformer group connects to the first Ethernet PHY, the first Ethernet interface and a joint connection of first PD controller and the HP-PD switch respectively; and wherein the first Ethernet transformer group is connected to the first Ethernet PHY, the first Ethernet interface and the first PD controller and the HP-PD switch respectively.

24. A system comprising a network device for receiving and supplying power over Ethernet, wherein the network device comprising:
- a powered device (PD) controller comprising a first power-receiving circuit capable of receiving power up to the first power limit from a first power sourcing equipment (PSE); wherein the first power limit is set according to IEEE802.3at standard or IEEE802.3af standard;
- a second power-receiving circuit capable of receiving power more than the first power limit from the first PSE;
- a PSE controller comprising a first power-supply circuit capable of supplying power up to the first power limit to a first powered device (PD);
- a second power-supply circuit capable of supplying power more than the first power limit to the first PD;
- at least one processing circuit executing program instructions for:
  (a) receiving power from the first PSE using the first power-receiving circuit;
  (b) determining to continue using the first power-receiving circuit or using the second power-receiving circuit based, at least in part, on a first indication; wherein the second power-receiving circuit is capable of receiving power more than the first power limit and the second power-receiving circuit is used by turning on a high-power PD (HP-PD) switch; wherein the first indication is used for indicating whether the first PSE is capable of supplying power more than the first power limit and is based, at least in part, on one or more of (i) receiving a first expected message from the first PSE, (ii) a first link status of an Ethernet link connecting the network device to the first PSE becoming stable, and (iii) a first manual switch status indicating that an instruction has been received from a user to use the second power-receiving circuit, wherein the first manual switch status can be controlled through a knob, button, webpage, user interface, application programming interface, console port, or display module;
  (c) using the second power-receiving circuit instead of using the first power-receiving circuit to receive power after it is determined that the first PSE is capable of supplying power more than the first power limit;
  (d) determining whether or not to continue using the second power-receiving circuit based on the first link status;
  (e) if the first link status is unstable, turning off the HP-PD switch and using the first power-receiving circuit for receiving power from the first PSE;
  (f) supplying power to the first PD using the first power-supply circuit after determining that the first PD is capable of receiving power over Ethernet;
  (g) determining to continue using the first power-supply circuit or to use a second power-supply circuit to supply power to the first PD based, at least in part, on a second indication, wherein second power-supply circuit is used by turning on a high-power PSE (HP-PSE) switch; wherein the second indication is used for indicating whether the first PD is capable of receiving power more than the first power limit and is based, at least in part, on one or more of (i) receiving a second expected message from the first PD, (ii) a second link status of an Ethernet link connecting the network device to the first PD becoming stable, and (iii) a second manual switch status indicating that an instruction has been received from a user to use the second power-supply circuit; wherein second manual switch status can be controlled through a knob, button, webpage, user interface, application programming interface, console port, or display module;

(h) using the second power-supply circuit instead of using the first power-supply circuit to supply power after it is determined that the first PD is capable of receiving power more than the first power limit (i) determining whether or not to continue using the second power-supply circuit based on the second link status;

(j) if the second link status is unstable, turning off the HP-PSE switch and using the first power-supply circuit for supplying power to the first PD.

25. According to the method of claim 24, wherein when the network device is not supplied with power more than the first power limit by the first PSE, the network device does not supply power more than the first power limit to the first PD.

26. According to the method of claim 24, further comprising sending a third message to the first PSE, wherein the third message is to indicate that the network device is capable of receiving power more than the first power limit, wherein the third message is sent before or after receiving the first message.

27. According to the method of claim 24, wherein the second power receiving circuit comprising the HP-PD switch, wherein the HP-PD switch is selected from a group consisting of a field-effect transistor (FET), a bipolar transistor, an insulated-gate bipolar transistor (IGBT), a metaloxide-semiconductor FET (MOSFET), a metal-semiconductor FET (MESFET), a junction FET (JFET), and a relay.

28. According to the method of claim 24, further comprising sending a fourth message to the first PD, wherein the fourth message is to indicate that the network device is capable of supplying power more than the first power limit, wherein the fourth message is sent before or after receiving the third message.

29. According to the method of claim 24, wherein the second power-supply circuit comprising the HP-PSE switch wherein the HP-PSE switch is selected from a group consisting of a field-effect transistor (FET), a bipolar transistor, an insulated-gate bipolar transistor (IGBT), a metal-oxide-semiconductor FET (MOSFET), a metal-semiconductor FET (MESFET), a junction FET (JFET), and a relay.

30. According to the system of claim 24, wherein the first PD further comprises: a first Ethernet interface, a first Ethernet transformer group, a first Ethernet physical transceiver (Ethernet PHY), a second Ethernet interface, a second Ethernet transformer group, a second Ethernet physical transceivers (Ethernet PHY); wherein the Ethernet transformer group connects to the first Ethernet PHY, the first Ethernet interface and a joint connection of the first PD controller and the HP-PD switch respectively; wherein the first Ethernet transformer group is connected to the first Ethernet PHY, the first Ethernet interface and the first PD controller and the HP-PD switch respectively;

wherein the second Ethernet transformer group connects to the second Ethernet PHY, the second Ethernet interface and the first PSE controller and the HP-PSE switch respectively; and wherein the second Ethernet transformer group is connected to the second Ethernet PHY, the second Ethernet interface and a joint connection of the first PSE controller and the HP-PSE switch respectively.

\* \* \* \* \*